(12) United States Patent
Zanoni et al.

(10) Patent No.: US 7,449,258 B2
(45) Date of Patent: Nov. 11, 2008

(54) INTEGRATED FUEL CELL STACK THERMOSTAT

(75) Inventors: Michael S. Zanoni, Glens Falls, NY (US); Daniel F. Woolley, Albany, NY (US)

(73) Assignee: Plug Power, Inc., Latham, NY (US)

( * ) Notice: Subject to any disclaimer, the term of this patent is extended or adjusted under 35 U.S.C. 154(b) by 782 days.

(21) Appl. No.: 10/872,923

(22) Filed: Jun. 21, 2004

(65) Prior Publication Data

US 2005/0282050 A1 Dec. 22, 2005

(51) Int. Cl.
*H01M 8/04* (2006.01)
(52) U.S. Cl. .............................. 429/13; 429/24; 429/26; 429/34; 429/38

(58) Field of Classification Search ....................... None
See application file for complete search history.

(56) References Cited

U.S. PATENT DOCUMENTS

2004/0247984 A1* 12/2004 Ismaier et al. ................ 429/38

FOREIGN PATENT DOCUMENTS

WO    WO 03/030291    *   4/2003

* cited by examiner

*Primary Examiner*—Jonathan Crepeau
(74) *Attorney, Agent, or Firm*—Trop, Pruner & Hu, P.C.

(57) ABSTRACT

A fuel cell system includes a fuel cell stack and a thermostat. The thermostat is mounted to the fuel cell stack to regulate a flow of coolant.

24 Claims, 9 Drawing Sheets

INTEGRATED FUEL CELL STACK THERMOSTAT

BACKGROUND

The invention generally relates to an integrated fuel cell stack thermostat.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

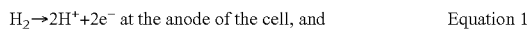
$$H_2 \rightarrow 2H^+ + 2e^- \text{ at the anode of the cell, and} \qquad \text{Equation 1}$$

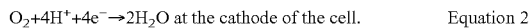
$$O_2 + 4H^+ + 4e^- \rightarrow 2H_2O \text{ at the cathode of the cell.} \qquad \text{Equation 2}$$

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel cell stack typically is part of a fuel cell system that circulates a coolant through the stack for purposes of regulating a temperature of the stack. More specifically, a coolant subsystem of the fuel cell system may include a coolant pump that establishes a coolant flow through the fuel cell stack to remove thermal energy from the stack; and the coolant subsystem may include a radiator to remove thermal energy from the coolant flow after the flow exits the fuel cell stack.

SUMMARY

In an embodiment of the invention, a fuel cell system includes a fuel cell stack. The fuel cell system also includes a thermostat that is mounted to the fuel cell stack to regulate a flow of coolant.

Advantages and other features of the invention will become apparent from the following drawing, description and claims.

DETAILED DESCRIPTION

During the initial startup phase of a fuel cell system, the temperature of the fuel cell stack typically is significantly lower than its normal operating temperature. Therefore, for purposes of rapidly warming up the fuel cell stack to the appropriate operating temperature, a fuel cell system may bypass the radiator of the coolant subsystem during the initial startup phase. For purposes of accomplishing this, the fuel cell system may include a radiator bypass subsystem, an arrangement including hoses, hose fittings and a thermostat for purposes of controlling when coolant flows through the radiator. More specifically, when the fuel cell stack is operating above a predefined threshold temperature, the radiator bypass subsystem routes coolant from the fuel cell stack through the radiator. However, when the fuel cell stack has a temperature that is below its desired operating temperature, the radiator bypass subsystem ensures that the coolant bypasses the radiator to permit rapid warmup of the coolant and fuel cell stack. A challenge in using the above-described radiator bypass subsystem is that the subsystem requires a significant number of components that may significantly increase the overall size, complexity and cost of the fuel cell system.

Figure 1:
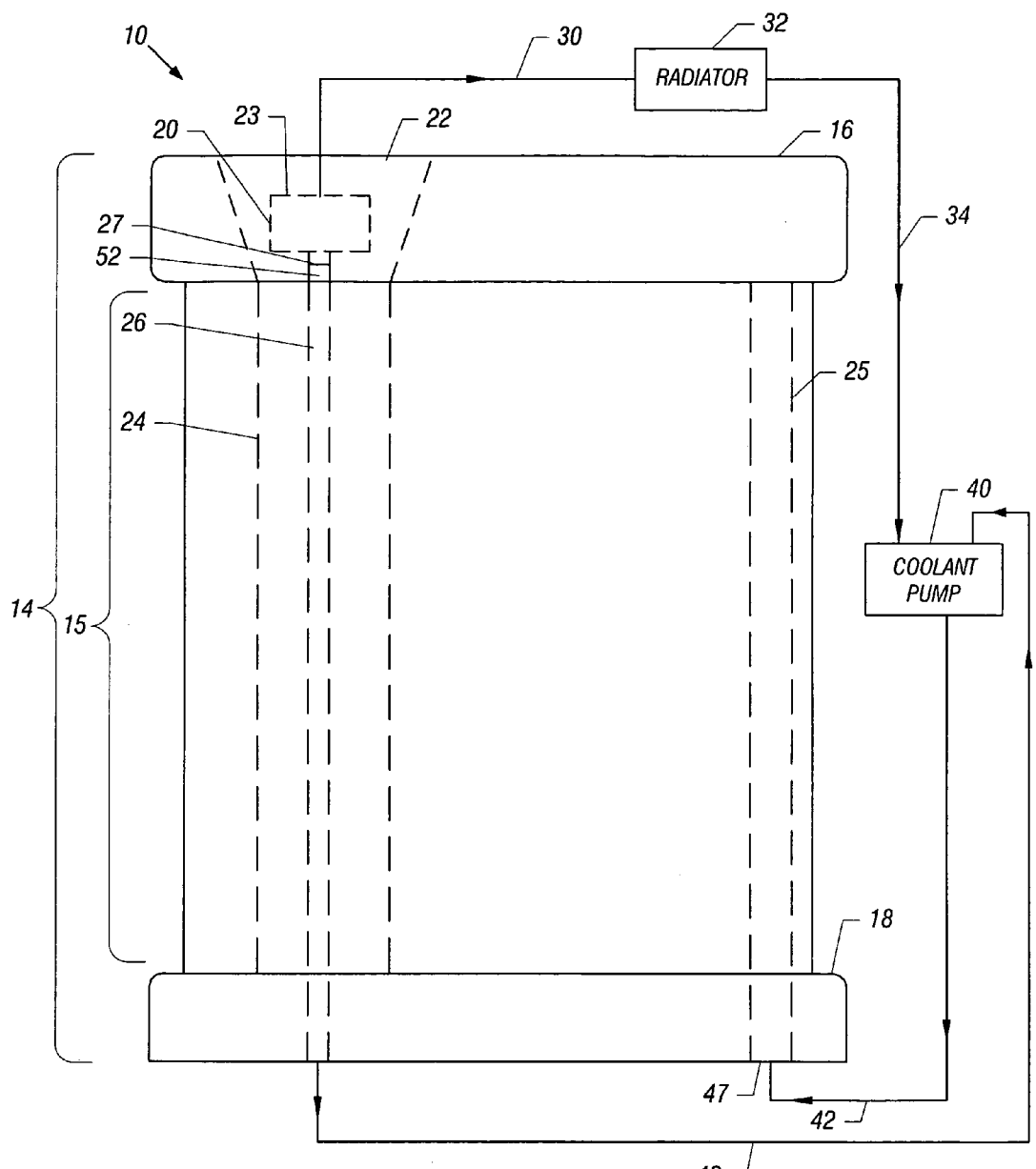
FIG. 1 is a schematic diagram of a system to regulate a flow of coolant through a fuel cell stack according to an embodiment of the invention.

FIG. 1 depicts a system 10 for regulating the flow of coolant through a fuel cell stack 14 in accordance with an embodiment of the invention. More specifically, the fuel cell stack 14 includes an inlet coolant manifold passageway 25 that extends through the fuel cell stack 14 to deliver coolant to the coolant flow channels formed in certain flow plates 15 of the stack 14. The coolant from the passageway 25 migrates through the coolant flow channels and enters an outlet coolant manifold passageway 24 that also extends through the stack 14.

For purposes of circulating the coolant through the fuel cell stack 14, the system 10 includes a coolant, pump 40 that pressurizes coolant that exits the pump 40 to flow through a hose 42 into a coolant inlet port 47 of the stack 14. From the coolant inlet port 47, the coolant flows into the inlet coolant passageway 25, through the flow channels of the various coolant flow plates and into the outlet coolant manifold passageway 24. A pocket 22, located in a top end plate 16 of the fuel cell stack 14, in some embodiments of the invention, is in communication with the passageway 24. As described below, the pocket 22 has a first outlet port to provide the outlet coolant flow to a radiator 32 and a second outlet port that is used to return the coolant to the coolant pump 40 while bypassing the radiator 32. A thermostat 20, disposed in the pocket, selects the appropriate coolant outlet port to receive the outlet coolant flow, depending on the temperature of the coolant.

More specifically, during a non-startup phase of the system 10, the coolant flows from the pocket 22, through an opening 23 (the first coolant outlet port) and into an outlet hose 30 that communicates the coolant to the radiator 32. The radiator 32 removes thermal energy from the coolant and returns the coolant (via a hose 34) to the coolant pump 40.

The fuel cell stack 14 includes features to rapidly warm up the fuel cell stack 14 during the startup (herein called the "startup phase") of the system 10. More specifically, during the initial startup phase when a temperature of the coolant is below some predefined threshold, the thermostat 20 blocks communication between the outlet of the passageway 24 and the hose 30 and opens communication between the coolant passageway 24 and an opening 52 (the second coolant outlet port) that is connected to a bypass tube 26.

As depicted in FIG. 1, the bypass tube 26 includes an upper inlet end 27 that extends into the pocket 22. From the inlet end 27, the bypass tube 26 extends down through the coolant manifold passageway 24 and through the flow plates 15 to an end plate 18 of the fuel cell stack 14. A fitting (not depicted in FIG. 1) is sealed to the lower end of the bypass tube 26 to communicate coolant from the bypass tube 26 to a hose 43 that returns the coolant to the coolant pump 40. Because the thermostat 20 prevents coolant from entering the hose 30 during the initial startup phase of the system 10 when the fuel cell stack 14 is warming up, the coolant bypasses the radiator 32.

When the coolant temperature reaches a predefined threshold, the thermostat 20 closes the communication between the passageway 24 and the inlet end 27 of the bypass tube 26 and opens coolant communication to the hose 30. Thus, in this state of the thermostat 20, coolant flows through the hose 30 and through the radiator 32 before returning to the coolant pump 40. Therefore, for this flow path, the radiator 32 removes thermal energy from the coolant to regulate the operating temperature of the fuel cell stack 14.

The arrangement that is depicted in FIG. 1 has one or more advantages over a system that may use a thermostat housing or mounting that is separate from the fuel cell stack 14. Because the thermostat 20 is integrated into the fuel cell stack 14, other components of the coolant bypass subsystem, such as the bypass tube 26 (for example), may also be integrated into the stack 14. More specifically, the arrangement that is depicted in FIG. 1 eliminates the need for an additional thermostat housing, reduces the potential number of hoses, reduces the potential number of hose connections and eliminates the need for a separate vent to vent air from the stack coolant during filling of the coolant. Furthermore, the arrangement that is depicted in FIG. 1 improves the serviceability of the thermostat and reduces packaging volume that allows for a smaller system to design. Furthermore, due to the compact arrangement, less heat transfer loss may be incurred to additional components. Other and/or different advantages may be possible in other embodiments of the invention.

The end plates 16 and 18, as their names imply, form the upper and lower boundaries, respectively, of the fuel cell stack 14. A primary function of the end plates 16 and 18 is to hold the fuel cell flow plates 15 in compression for purposes of energizing seals between the flow plates 15. In some embodiments of the invention, the lower end plate 18 may serve as the service end for the fuel cell stack 14, in that various coolant, fuel, oxidant and electrical connections may be present at this end of the stack 14. The flow plates 15 include various flow channels (serpentine surface flow channels, for example) to communicate reactant flows to establish serially-connected fuel cells and to communicate the coolant flow throughout the fuel cell stack 14. The fuel cell stack 14 also includes various gaskets, gas diffusion layers, PEMs, etc., for purposes of forming the fuel cells. Furthermore, the flow plates 15 each includes manifold openings, for inlet and outlet coolant flows, fuel flows and oxidant flows. When the flow plates 15 are aligned to form the fuel cell stack 14, these openings align to form the various manifold passageways through the stack 14, such as the coolant passageways 24 and 25.

Figure 2:
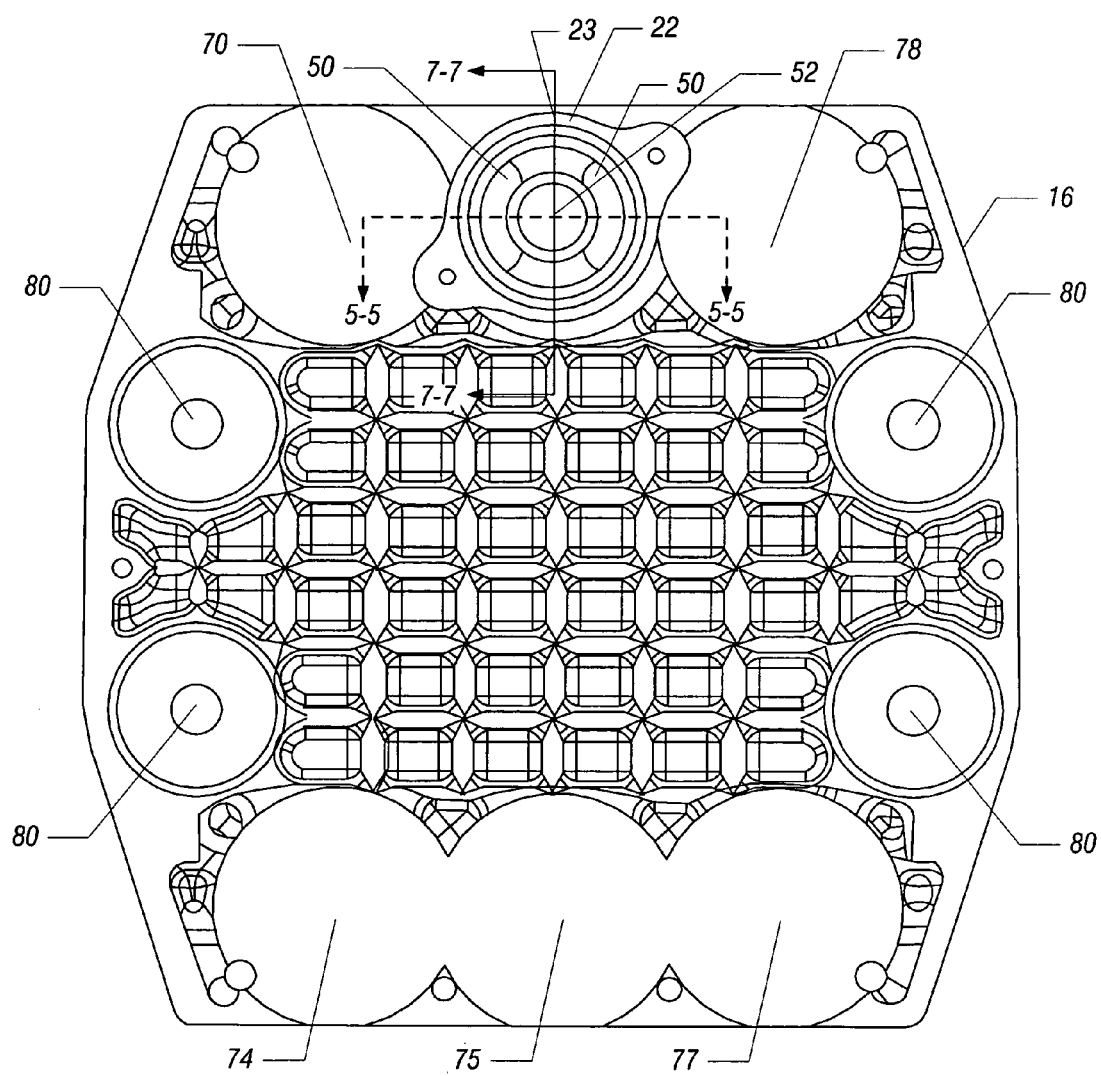
FIG. 2 is a top view of an end plate of a fuel cell stack according to an embodiment of the invention.

FIG. 2 depicts a top view of the end plate 16 of the fuel cell stack 14 according to an embodiment of the invention. As shown, the end plate 16 includes the pocket 22 that is formed in the end plate 16 for housing the thermostat 20 (not depicted in FIG. 2). The pocket 22 is aligned over the top end opening of the coolant outlet manifold passageway 24. The pocket 22 includes the lower opening 52 that receives the bypass tube 26. As depicted in FIG. 2, the pocket 22 also includes two additional openings 50, each of which partially circumscribes the opening 52. The openings 50 serve as ports to receive coolant flow from the coolant manifold passageway 24. The opening 52 is circumscribed by a boss 54, the inner diameter of which closely matches the outer diameter of the bypass tube 26 to hold the bypass tube 26 to the pocket 22.

In some embodiments of the invention, the lower end of the bypass tube 26 may form a similar connection with the lower end plate 18 in that a boss (not shown) of the lower end plate 18 receives the lower end of the tube 26. For these embodiments of the invention, the boss in the lower end plate 18 may contain an internal annular shoulder to limit the downward travel of the bypass tube 26.

The pocket 22 may be generally tapered, in that the top opening 23 of the pocket 22 is larger than the bottom opening 52, in some embodiments of the invention. The top opening 23 is adapted to receive an outlet hose fitting (not depicted in FIG. 2) that communicates coolant out of the stack 14 when the stack 14 has reached its operating temperature. The thermostat 20, however, during the initial warmup of coolant, blocks coolant flow to the outlet hose fitting so that coolant flows back through the opening 52 and into the bypass tube 26.

The stack includes various regions 70, 74, 75, 77 and 78, each of which is constructed to seal off a particular manifold passageway. For example, the region 75 is constructed to form a seal with the top end of the inlet coolant manifold passageway 25. Likewise, the regions 70, 74, 77 and 78 are designed to form seals with the top ends of the inlet and outlet fuel and oxidant manifold passageways. The end plate 16 also includes openings 80 that receive bolts that extend to the lower end plate 18. These bolts connect the end plates 16 and 18 for purposes of maintaining a compression of the flow plates 15 that are disposed in between. More specifically, in some embodiments of the invention, these bolts extend along the outside of the flow plates 15.

Figure 3:
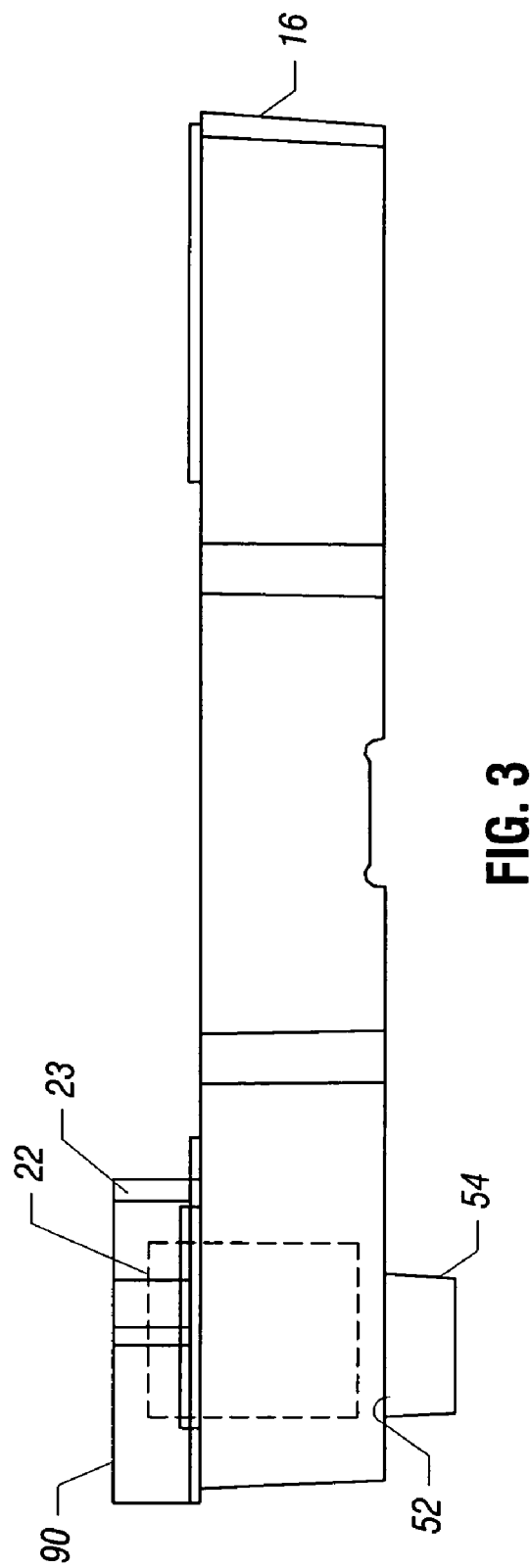
FIG. 3 is a side view of the end plate according to an embodiment of the invention.

Referring to FIG. 3, in some embodiments of the invention, the end plate 16 is generally planar and may include a raised extension 90 on its upper surface to form part of the pocket 22. In other embodiments of the invention, the thermostat may be located entirely inside the planar portion of the end plate 16. Thus, many other embodiments are contemplated and are within the scope of the appended claims. As also depicted in FIG. 3, the boss 54 generally extends below the general plane of the plate 16 and into the outlet coolant manifold passageway 24 to receive the bypass tube 26.

Figure 4:
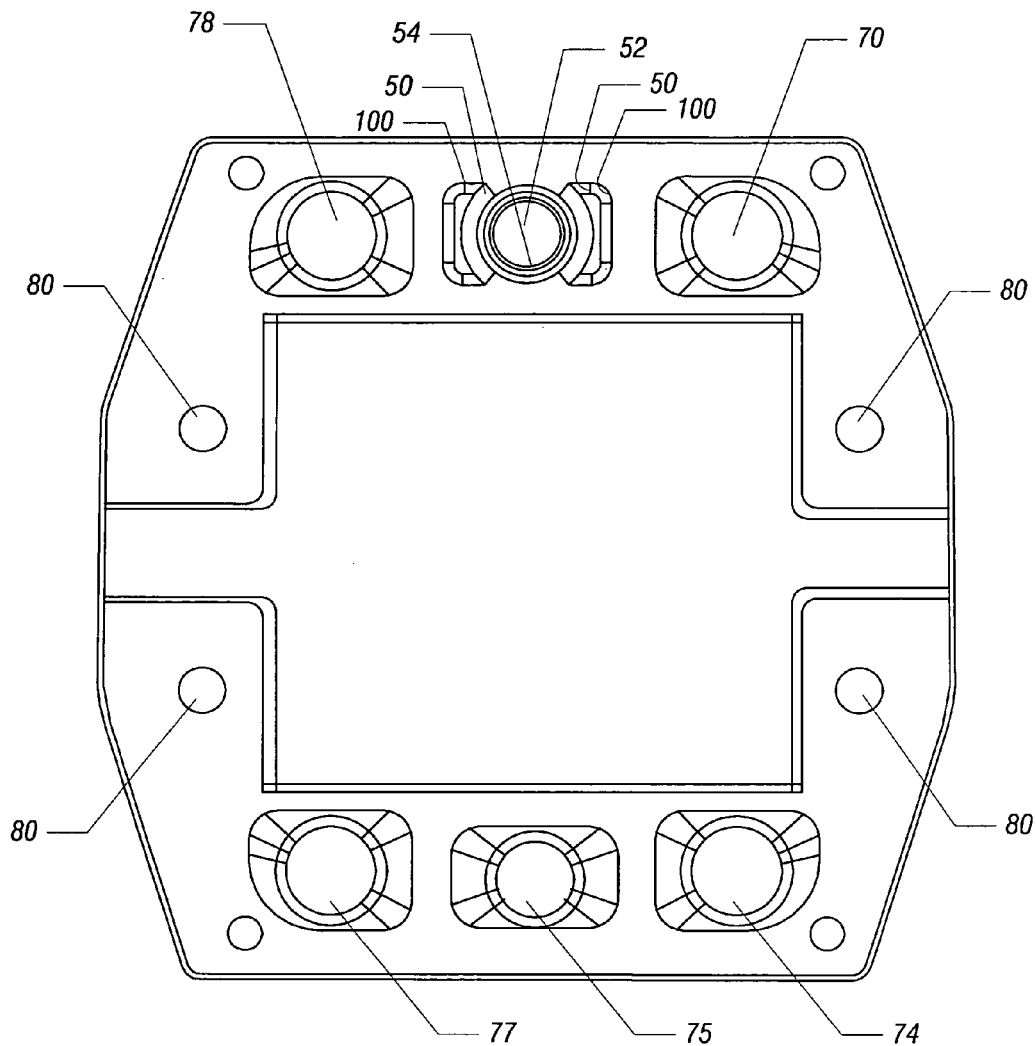
FIG. 4 is a bottom view of the end plate according to an embodiment of the invention.

As depicted by the reference numerals 100 in FIG. 4 (depicting a bottom view of the end plate 16), the port openings 50 may be generally tapered. Furthermore, the regions of the plate 16 that surround the openings 70, 74, 75, 77 and 78 may also be tapered.

Figure 5:
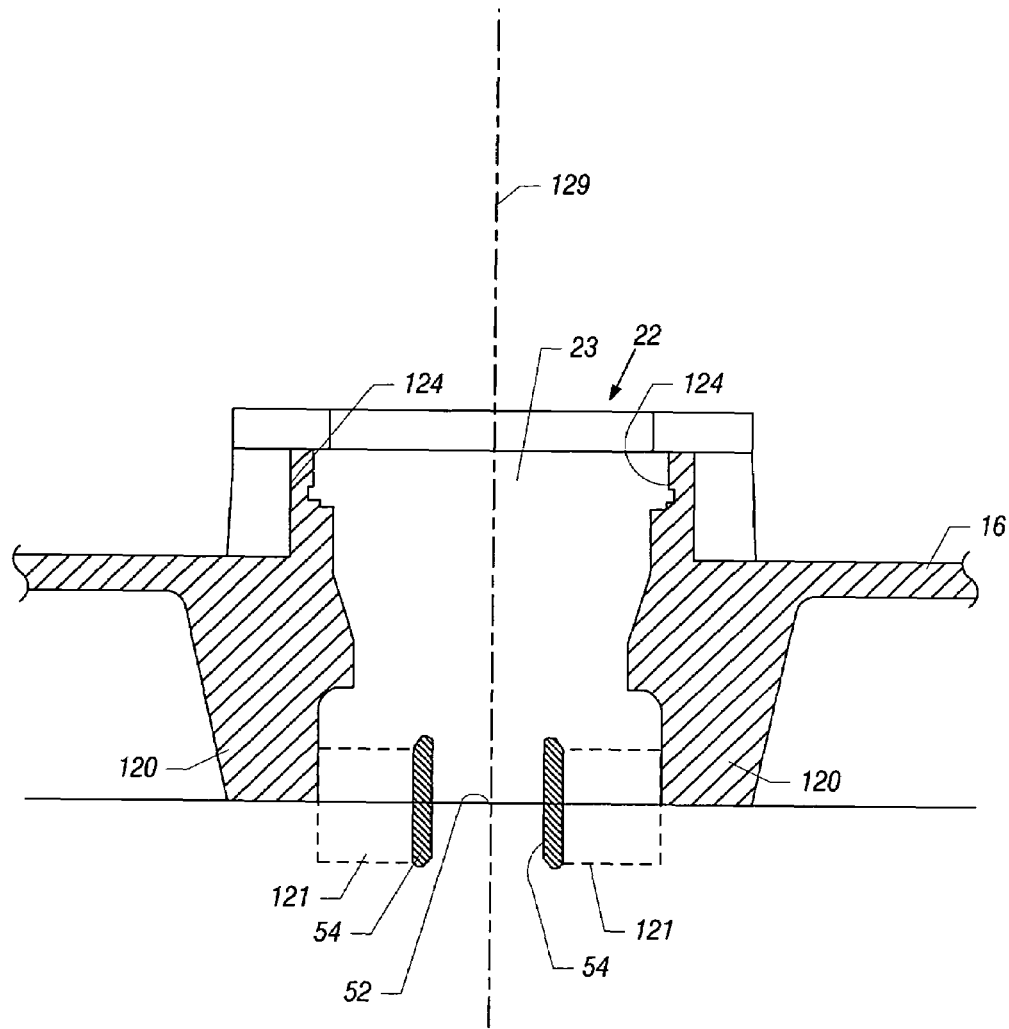
FIG. 5 is a cross-sectional view taken along line 5-5 of FIG. 2 according to an embodiment of the invention.

As a more specific example, FIG. 5 depicts a more detailed view of the pocket 22 in accordance with some embodiments of the invention, taken along line 5-5 of FIG. 2. As shown, the pocket 22 includes regions 121, established by the openings 50, that permit coolant flow into the pocket 22. Furthermore, the bypass tube is received in the opening 52. As shown, the pocket 22 may be generally symmetrical about a longitudinal axis 129. The pocket 22 may also include an annular groove 124 that is located near the opening 23. The groove 125 circumscribes the longitudinal axis 129. The groove 124 is formed in the body 120 of the pocket 22 and as described further below, is adapted to receive a flanged end of a hose fitting and also receive a flange of the thermostat 20, in some embodiments of the invention.

Figure 6:
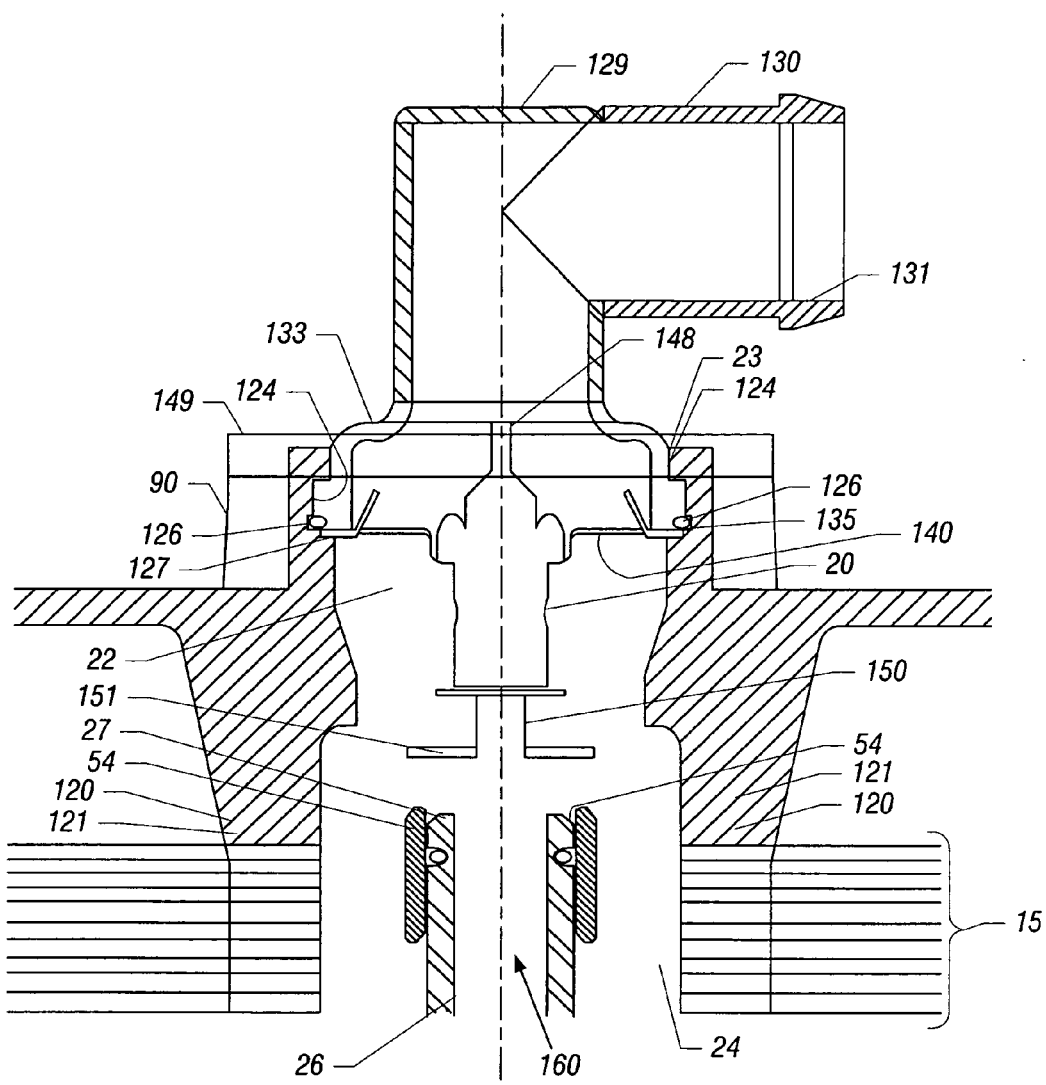
FIG. 6 is a more detailed schematic diagram of a portion of the system of FIG. 1 depicting the integration of a stack thermostat into the fuel cell stack according to an embodiment of the invention.

More specifically, FIG. 6 depicts a hose fitting 130 and the thermostat 20 that are mounted inside the pocket 22 in accordance with some embodiments of the invention. The hose fitting 130 is designed so that a lower end 135 of the fitting 130 may be inserted into the opening 130.

As also depicted in FIG. 6, the longitudinal axis of the thermostat 20 may be generally concentric with the longitudinal axis 129 of the pocket. The thermostat 20 may be suspended inside the pocket 22 by a radial flange 140 (of the thermostat 20) that circumscribes the main body of the thermostat 20 and rests on a lower shoulder 127 of the groove 124. The end 135 of the fitting 130 is above the flange 140; and the shoulder 127 is below the flange 140. Thus, the fitting 130 serves to lock the thermostat 20 in place inside the pocket 22. As also depicted in FIG. 6, in some embodiments of the invention, a seal 126 (an O-ring, for example) may be located inside the annular groove 124 between the end 135 and wall of the pocket 22.

The thermostat 20 operates in the following manner, in some embodiments of the invention. The thermostat 20 includes a mandrel, a top end 148 and a lower end 150 of which are depicted in FIG. 6. The thermostat 20 also includes ports (not depicted in FIG. 6) that are opened and closed by movement of this mandrel. In the state of the thermostat 20 depicted in FIG. 6, the mandrel is at its uppermost position to block off communication through the thermostat 20. Therefore, in the depicted position, coolant does not flow through the thermostat 20; and thus, coolant does not flow through an outlet port 131 of the hose fitting 130. The lower end 150 of the mandrel includes a sealing flange 151 that seals off the top end 27 of the bypass tube 126 when the mandrel is in its lowermost position. In the position depicted in FIG. 6, the mandrel is in its uppermost position. Therefore, in this position, the flange 151 is removed from the valve seat presented by the top end surface of the bypass tube 26 to allow coolant to flow from the coolant passageway of the stack back into a central passageway 160 of the bypass tube 26.

The state that is depicted in FIG. 6 is for the condition in which the system 10 is in the startup phase and the coolant has not reached the appropriate temperature to cause the thermostat 20 to close off flow through the bypass tube 26 and permit coolant to flow from the coolant passageway of the stack out of the hose fitting 130. However, when the coolant reaches the predefined temperature threshold, the mandrel of the thermostat 20 moves in a downward direction so that the sealing flange 151 seals off the bypass tube 26. Furthermore, in this lower position of the mandrel, the thermostat 20 allows coolant to pass through the thermostat 20 into the fitting 130, out of an outlet 131 and into the hose 30 (see also FIG. 1).

In some embodiments of the invention, the thermostat 20 may be driven by a wax motor. In this regard, in a relatively unexpanded state of the wax, the mandrel of the thermostat 20 remains in the upper position depicted in FIG. 6. However, as the temperature of the coolant increases, the wax expands to drive the mandrel in a downward direction to seal off the bypass tube 26 in open communication to the outlet 131 and thus, to the radiator 32 (see also FIG. 1).

Among the other features of the pocket 22, in some embodiments of the invention, the body 120 of the pocket 22 includes a lower extension 121 that circumscribes the perimeter of the top outlet of the coolant manifold passageway 24. A gasket (not shown) is located between the bottom end of the extension 121 and the uppermost flow plate of the stack 15 to form a seal between the end plate 16 and the rest of the stack 15. Furthermore, in some embodiments of the invention, the upward extension 90 of the pocket 22 may include an upper flange surface 149 for purposes of receiving a flange to lock the fitting 130 in place, as further described below.

Figure 7:
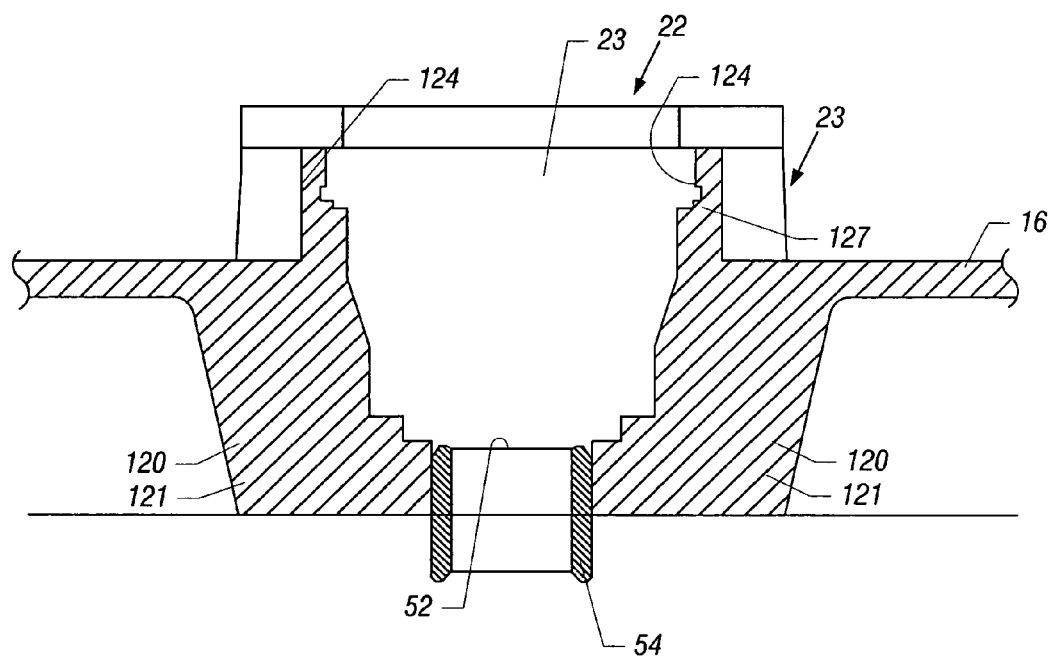
FIG. 7 is a cross-sectional view taken along line 7-7 of FIG. 2 according to an embodiment of the invention.

FIG. 7 depicts a cross-sectional view of the pocket taken along line 7-7 of FIG. 2. As shown, except for the ports 50, the pocket 22 is sealed off from the coolant manifold passageway 24. Thus, in a cross-section of the pocket 22 not taken through the port (i.e., the view depicted in FIG. 7), the body 120 of the pocket 22 extends to the boss 54.

Figure 8:
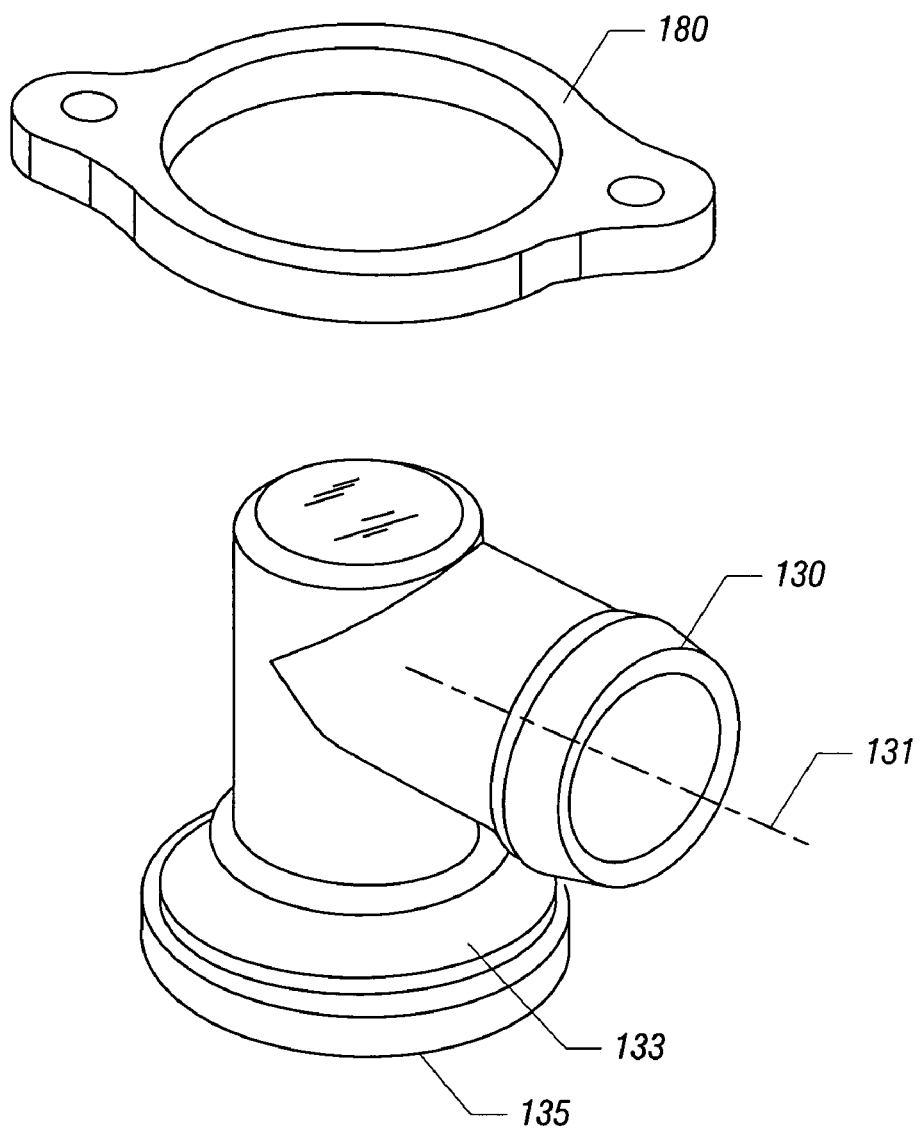
FIG. 8 is an exploded perspective view of a hose connection to the fuel cell stack according to an embodiment of the invention.

FIG. 8 depicts an exploded perspective view of an outlet hose fitting assembly that is connected to the pocket 22. More specifically, this assembly includes the hose fitting 130 that is held in place by a flange 180. More specifically, the lower surface of the flange 180 rests on the flange surface 149 (see FIG. 6) of the pocket 22 and also extends partially over an upper radial shoulder 133 of the fitting 130. However, to prevent inadvertent removal of the hose fitting 130 from the pocket 22, the flange 180 includes screw holes 181 that receive screws to mount the flange 180 to the service plate 16.

Figure 9:
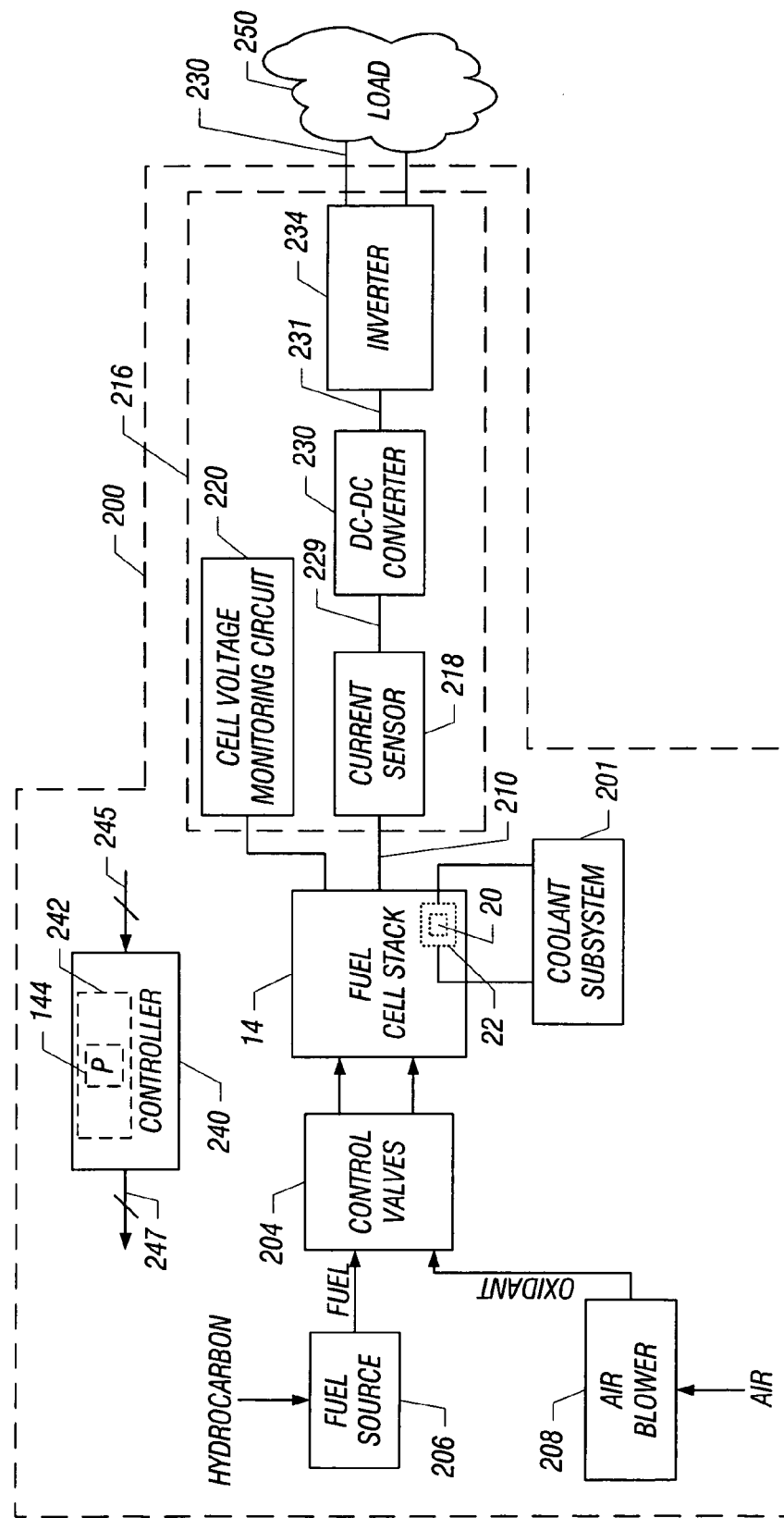
FIG. 9 is a schematic diagram of a fuel cell system according to an embodiment of the invention.

Referring to FIG. 9, in some embodiments of the invention, the integrated thermostat may be used in a fuel cell system 200. In the system 200, the coolant pump 40 (FIG. 1) and the radiator 32 (FIG. 1) are part of an overall coolant subsystem 201 that circulates coolant through the fuel cell stack 14. The fuel cell stack 14 receives reactant and oxidant flows from a fuel processor 206 and an air blower 208, respectively. Alternatively, in other embodiments of the invention, the fuel processor 206 may be replaced by a hydrogen supply (a hydrogen tank, for example). Control valves 204 of the fuel cell system 200 may regulate the communication of the fuel and oxidant flows to the fuel cell stack 14. The fuel cell system 200 may also include a power conditioning subsystem 216 for purposes of communicating power from the fuel cell stack 14 to an external load 250. For example, the power conditioning subsystem may include, for example, a DC-to-DC converter 230 that converts a DC voltage of the fuel cell stack 14 into another voltage level (that appears on a terminal 231) that, in turn, is converted by an inverter 234 to an AC voltage that appears on output terminals 230 of the fuel cell system 200.

Additionally, the power conditioning subsystem 216 may include various sensors and monitoring circuits for purposes of controlling operation of the power conditioning system and/or for purposes of controlling operation of the overall fuel cell system 200. For example, the power conditioning system 216 may include a current sensor 218 for purposes of monitoring the current of the fuel cell stack 14 as well as a cell voltage monitoring circuit 220 for purposes of monitoring individual cell voltages, groups of cell voltages and/or a stack voltage of the fuel cell stack 14.

The various sensors and other circuits communicate (via communication lines 245) to a controller 240 of the fuel cell system 200. The controller 240 may include, for example, one or more microcontrollers or microprocessors, as examples. The controller 240 may include a memory 242 that stores program instructions 144 for purposes of programming the controller 240 to control the fuel cell system 200. The controller 240 communicates with the fuel cell system via several control lines 247. As examples, the controller 240 may control operation of the fuel processor 206, may control operation of various motors (fan motors, actuator motors, valve control motors, etc.), control operation of the DC-DC converter 230, control operation of the inverter 234, control operation of the coolant subsystem 201, etc., depending on the particular embodiment of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:
   a fuel cell stack;
   a thermostat mounted to the fuel cell stack to regulate a flow of coolant; and
   a bypass tube located inside an internal coolant passageway of the stack, wherein the thermostat regulates flow of the coolant into the bypass tube.

2. The fuel cell system of claim 1, wherein the thermostat is mounted inside a pocket formed in the fuel cell stack.

3. The fuel cell system of claim 1, wherein the thermostat is mounted inside a pocket formed in an end plate of the fuel cell stack.

4. The fuel cell system of claim 1, further comprising:
   a radiator,
   wherein the thermostat controls whether the flow of coolant flows through the radiator.

5. The fuel cell system of claim 1, wherein the thermostat is adapted to open communication between the bypass flow tube and the coolant passageway in response to the a temperature of the coolant being below a predefined temperature threshold.

6. The fuel cell system of claim 1, further comprising:
   a radiator,
   wherein the bypass tube is adapted to bypass the radiator when the temperature of the coolant is below the predefined threshold.

7. The fuel cell system of claim 1, wherein the thermostat is located inside a pocket formed in the stack and the pocket comprises a shoulder to secure a flange of the thermostat to the stack.

8. The fuel cell system of claim 7, further comprising:
   an outlet fitting to communicate the coolant from the fuel cell stack, the fitting comprising an end to Jock the flange to the shoulder.

9. The fuel cell system of claim 1, wherein the thermostat is located inside a pocket of the fuel cell stack, the pocket comprising a boss to hold a coolant bypass tube.

10. The fuel cell system of claim 1, wherein the thermostat is located inside a pocket of the fuel cell stack, the pocket comprising:
    at least one port to receive a coolant flow from the fuel cell stack.

11. A method usable with a fuel cell stack, comprising:
    mounting a thermostat to the fuel cell stack to regulate a flow of coolant;
    forming a pocket in the stack;
    disposing the thermostat in the pocket;
    forming a boss in the pocket to hold a coolant bypass tube; and
    routing the bypass tube through an internal coolant manifold passageway of the stack.

12. The method of claim 11, further comprising:
    forming a pocket in the fuel cell stack and disposing the thermostat inside the pocket.

13. The method of claim 11, further comprising: forming a pocket in an end plate of the stack and disposing the thermostat inside the pocket.

14. The method of claim 11, further comprising:
    operating the thermostat to selectively bypass a radiator.

15. The method of claim 14, wherein The selectively bypassing comprises:
    bypassing the radiator in response to a temperature of the coolant being below a predefined temperature threshold.

16. The method 0f claim 14, wherein the selectively bypassing comprises:
    not bypassing the radiator in response to the temperature of the coolant exceeding a predefined threshold.

17. The method of claim 11, further comprising:
    forming a pocket in the fuel cell stack; and
    forming a shoulder in the pocket to hold a flange of the thermostat.

18. The method of claim 17, further comprising:
    using an outlet fitting to lock the flange to the shoulder.

19. A fuel cell system comprising:
    a structure to form at least one fuel cell, the structure comprising an internal passageway to communicate coolant to remove thermal energy from said at least one fuel cell;
    a thermostat mounted to the structure to regulate a flow of coolant; and
    a heat exchanger bypass tube located inside the internal passageway, wherein the thermostat regulates flow of the coolant into the bypass tube.

20. The fuel cell system of claim 19, wherein the thermostat is mounted at least partially inside a pocket formed in the structure.

21. The fuel cell system of claim 19, further comprising:
    a heat exchanger,
    wherein the thermostat controls whether the flow of coolant flows through the heat exchanger.

22. A method usable with a fuel cell stack, comprising:
    mounting a thermostat to the fuel cell stack to regulate a flow of coolant;
    disposing a bypass tube in an internal coolant manifold passageway of the stack; and
    using the thermostat to regulate communication of coolant with the bypass tube.

23. The method of claim 22, further comprising:
    forming a pocket in the fuel cell stack and disposing the thermostat inside the pocket.

24. The method of claim 22, further comprising:
    forming a pocket in an end plate of the stack and disposing the thermostat inside the pocket.

* * * * *

UNITED STATES PATENT AND TRADEMARK OFFICE
CERTIFICATE OF CORRECTION

PATENT NO. : 7,449,258 B2  Page 1 of 1
APPLICATION NO. : 10/872923
DATED : November 11, 2008
INVENTOR(S) : Michael S. Zanoni and David F. Woolley It is certified that error appears in the above-identified patent and that said Letters Patent is hereby corrected as shown below:

In Column 7:
Line 55, "Jock" should be --lock--.

In Column 8:
Line 18, "The" should be --the--; and
Line 22, "0f" should be --of--.

Signed and Sealed this

Thirtieth Day of December, 2008

JON W. DUDAS
*Director of the United States Patent and Trademark Office*